United States Patent Office 2,886,615
Patented May 12, 1959

2,886,615

FIXED BED REGENERATIVE REFRACTORY PYROLYTIC GAS CONVERSION PROCESS

Harold A. Lindahl, Elmhurst, Ill., assignor to The Pure Oil Company, Chicago, Ill., a corporation of Ohio Application December 19, 1956, Serial No. 629,407

7 Claims. (Cl. 260—683)

This invention relates to a high temperature gas conversion process. It is more specifically concerned with effecting heat economies in the operation of pyrolytic systems.

In treating gaseous or vaporous feed stocks in non-catalytic, pyrolytic processes, regenerative, refractory systems provide certain operating advantages over the tubular, pyrolysis furnace. The use of consecutive beds of hot and cold granular refractory masses (pebbles) as the heat-transfer media in a pyrolytic reaction system effects the rapid heating of feed gas and quenching of effluent gas. These rapid heating and quenching rates permit short contact times with resulting high conversions and low coke formation. Because of the high temperatures and heat capacities involved in gas conversion systems of this type, it is important that efficient heat exchange and recovery be provided in the operation of regenerative, refractory pyrolytic systems in order that an economical operation can be carried out.

It is, therefore, the primary object of this invention to effect heat economies in the operation of a fixed-bed type of gas pyrolysis process employing a granular mass of refractory, heat-transfer particles. Another object of this invention is to reduce the fuel requirements in the reheating cycle of the process. An additional object of this invention is to expedite the reheating cycle employed in a fixed-bed, regenerative, refractory, pyrolytic process.

The attached drawing shows schematically the thermal conditions which exist within a fixed-bed pebble heater during the process steps of this invention.

Figure 1:
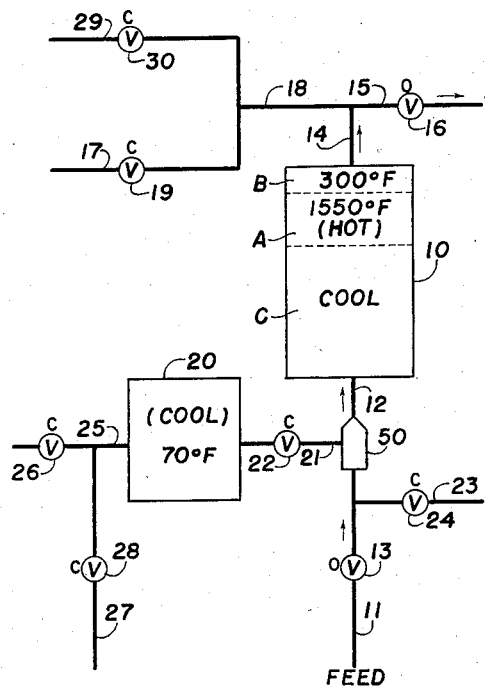
Figure 1 shows the hot-zone position and flow at the end of the processing phase.

Regenerative, refractory, pyrolysis processes can be carried out employing either a stationary refractory mass or a moving mass of refractory. Systems of the former type are available in which heat-transfer is effected by employing refractory shapes such as bricks or tiles stacked to form a plurality of uniform, internal flues. With the availability of satisfactory refractories it has been found to be advantageous, because, inter alia, of the more efficient gas-solid contact, to employ granular masses of refractory materials in pellet or bead form, commonly called "pebbles," as the heat-transfer media. In comparing stationary- and moving-bed pebble types of regenerative, refractory, pyrolysis systems, it is evident that the stationary-bed type has decided advantages such as higher temperature application, freedom from pebble abrasion, thereby eliminating the need for continuous pebble replacement, and others.

Stationary-bed pebble heaters can be employed for numerous high temperature, gas conversion, chemical manufacturing processes. It is especially adaptable in processing hydrocarbon feed stocks such as natural gas, waste refinery gases, and substantially pure hydrocarbons such as propane, ethane, or mixtures thereof, as well as distillate feed stocks such as naphtha, gas-oil, and the like to prepare olefins, acetylenes, etc. Other high temperature, chemical reactions which can be carried out include such reactions as the synthesis of succinonitrile from cyanogen and ethylene, the synthesis of acrylonitrile from hydrogen cyanide and ethylene, the manufacture of cyanogen from hydrogen cyanide and nitrogen dioxide, the production of hydrogen cyanide from saturated hydrocarbons and nitric oxide and the synthesis of acrylonitrile from cyanogen and ethylene. Because these processes operate at temperatures of 2000° F. to in excess of 3000° F., severe heating requirements are imposed on the systems. This requires that efficient heat-recovery systems be employed to complement the processing and heating cycles in order to operate the processes economically.

A conventional expedient for recovering heat in pyrolytic processes of this nature is a waste heat installation through which the effluent produced during the heating cycle passes in counter-current flow and indirect heat-exchange with the combustion air which is utilized during the heating phase of the processing cycle. An example of a system of this nature, which utilizes a suitable heat exchanger, of sufficient capacity is shown in a copending application entitled Process, Harvey Hennig, Serial No. 629,388, filed December 19, 1956. According to the subject invention, it has been found that additional heat economies are achieved by employing a secondary heat reservoir containing a mass of heat-absorbing particles through which is passed the effluent from the processing chamber during an intermediate purging phase subsequent to the processing phase, and preceding the reheating phase of the operating cycle.

The invention will be more completely understood by reference to the drawing in which a single pebble bed, upflow reaction system is shown in processing gaseous and/or vaporous feed stocks in a fixed-bed, regenerative, refractory, pyrolytic process of the type employed in this invention. It has been found that hot reaction zone A in reactor 10 (Figure 1) moves only a relatively short distance up and down in the reactor during the processing phase of the cycle. The flow of feed stock introduced via lines 11 and 12, regulated by valve 13, through the heated mass of granular particles disposed in reactor 10 is stopped when the temperature of the heating zone has decreased to below an effective level. The reaction effluent, after being quenched in zone B, leaves the reaction system through lines 14 and 15. Flow through these lines to the recovery system (not shown) is regulated by valve 16. In reheating or regenerating the particle mass, hot zone A in the illustrative system shown in Figure 1 must be moved back to the bottom of the pebble mass and be reheated to the desired processing temperature. At the termination of the processing phase of an upflow type of reaction system, hot zone A will be positioned adjacent to the upper end of processing vessel 10, as shown in Figure 1, and separated therefrom by cool zone B which serves as a quenching zone. In reheating and regenerating the refractory mass in accordance with this invention, feed to the reaction zone is stopped by closing valve 13 in line 11, and flow through line 15 to the recovery system is stopped by closing valve 16. The fluid flow through the refractory mass is reversed (see Figure 2) by injecting a high flow of a cool, inert gas into the top of processing vessel, or reactor 10, through lines 17 and 18, the flow of gas in line 17 being controlled by valve 19 which is open during this phase of the cycle. This inert gas is introduced into the system at a temperature of about 100° to 300° F., and moves hot zone A downward. Flow is maintained until a portion of hot zone A has been pushed from processing vessel 10 into heat-reservoir 20. It is necessary to actually move part of the hot zone out of the reactor through lines 12 and 21 to assure its proper positioning during the reheat step described below. The gases issuing from processing vessel 10 when part of hot zone A is being pushed out are too hot for valve 22 in line 21; accordingly, cooling air is injected at line 23 through valve 24 and lines 12 and 21. This also protects valve 13 from exposure to high-temperature gases. The cooled purge gas exits from the system by means of line 25. This flow is controlled by valve 26.

Figure 2:
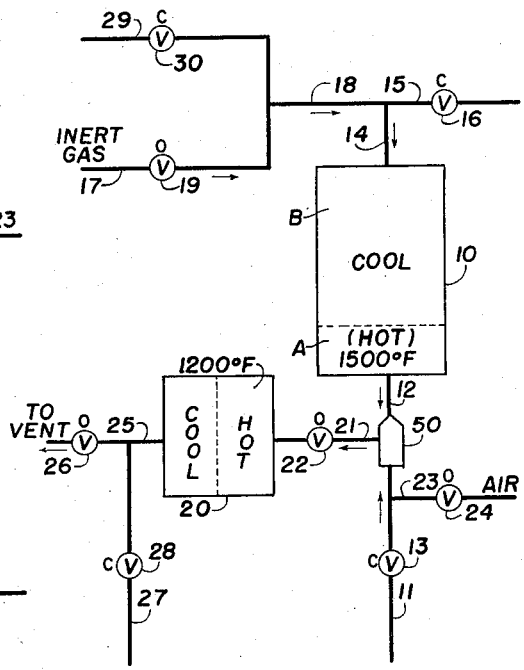
Figure 2 shows the thermal conditions which exist within the processing vessel at the end of a downflow purge which follows the processing phase.
Figure 3:
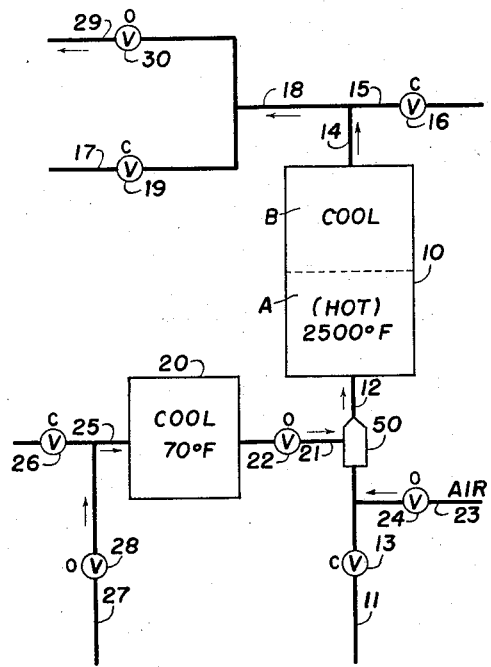
Figure 3 illustrates the position of the several thermal zones within the apparatus employed in this invention, when the reactor is ready to initiate the process phase of the cycle.

When hot zone A has moved to the position shown in Figure 2, at the end of the processing cycle, the flow of inert gas is stopped. The reheating cycle is started and the flow pattern shown in Figure 3 is established to reheat reaction zone 10. In the course of this cycle, hot zone A will have moved reciprocatively several times in the reactor by alternating the introduction of the reactants by means of a manifold system (not shown) whereby the feed can be introduced in the reactor through the top or bottom. In a typical processing cycle, the reactants are introduced to the bottom of reactor 10. The hydrocarbon feed can, if desired, be diluted with steam or other diluent. As the feed passes upward through reactor 10, hot zone A bounded by a "cold front" and "hot front" also moves upward. The incoming, relatively cold (100°–300° F.) feed cools the pebbles behind the advancing "cold front" to create a cold zone. At the same time, the hot products of reaction are quenched as they pass from zone A through "hot front" into the cold quenching zone. The "hot front" moves upward as the heat contained in the reaction gases is progressively transferred to the pebbles in zone B. The cold products of reaction then leave the top of reactor 10, and are transferred to any conventional separation means.

At the end of the first cycle, as hot zone A approaches the top of reactor 10 and zone B is about 1 foot or less in length, the flow of hydrocarbon feed is reversed in direction by means of a manifold system not shown in the attached drawing. At the same time, the manifold system is regulated to provide for the reaction effluent to be withdrawn from the bottom of reactor 10 and passed to the product recovery system. This reversal of flow must take place before cold zone B has been completely displaced from the pebble bed so that there is still sufficient cold zone to effectively quench the products of reaction below reaction temperature.

With the new flow conditions, hot zone A moves from top to bottom in reactor 10, and cold zone C now is the quenching zone. When zone C becomes so small as to be nearly ineffective, the flows can once more be reversed as described initially in the cycle.

This reversal of flow in reactor 10 can be continued until the pebble bed temperature in zone A is reduced to a level where satisfactory conversion of hydrocarbon feed is no longer attainable. The loss in temperature level in zone A is due to heat losses through the sides of the vessel and to the large endothermic heat of reaction required in the reactions, such as cracking and dehydrogenation reactions occurring in zone A during the processing of hydrocarbon feed stocks. Hot zone A in moving through the reaction vessel moves as a unit. In carrying out endothermic reactions little, if any, spreading of the original boundaries of zone A occur before the temperature of the zone drops below the desired conversion level. If exothermic reactions are employed care must be taken to insure that the original boundaries of zone A do not spread so far as to prevent an adequate size quenching zone to be maintained during the processing cycle.

As the temperature of zone A drops, it is possible to maintain a high conversion level by reducing the feed rate and/or increasing the proportion of propane in the feed, since propane is more reactive than ethane in the thermal reactions of dehydrogenation and cracking.

To provide for continuous operation, two or more pebble beds are required, and while one bed is on its reaction cycles, the other bed is being reheated. The beds are generally identical in operation and construction. In the reheating step, fuel gas is admitted to the system through lines 27 and 25 by opening valve 28 into heat-reservoir 20. In reservoir 20, the heat stored during the purge step is absorbed by the fuel gas which then flows through valve 22 and line 21 to a point of confluence with line 12. Air is admitted through line 23, and valve 24, and is admixed in line 12 with the fuel gas to form a combustible mixture which is ignited in a conventional burner 50. The hot combustion gases then flow through line 12 to reactor 10 until hot zone A of the desired temperature and size has been established. The cooled gas is vented from the system through lines 14, 18 and 29. This flow is controlled by valve 30 in line 29. At this time (see Figure 3), air and fuel flows are stopped, and the flow pattern of Figure 1 is again established for another reaction period.

A specific example of this invention is described as follows with reference to Figures 1, 2, and 3. Cylindrical reactor 10, twelve feet inside diameter and five feet axial length, is packed with ¼-inch diameter, spherical, alumina pebbles. The cross-sectional area of the reactor is 113 square feet and the reactor volume is 565 cubic feet. The reactor is maintained at about atmospheric pressure. The hot section of the pebbles is initially at a temperature of about 2500° F. The extent of this section is about 2 feet. The remainder of the pebble bed is at 300° F. A mixture of 5 moles of steam per mole of ethane at the rate of 565 pounds per minute is passed through reactor 10 for about 20 minutes to produce a reaction effluent consisting essentially of 70 mole percent of acetylene and 30 mole percent of ethylene. The flow of reactant mixture through reactor 10 is reversed by means of a suitable manifold system and the rate increased to 1030 pounds per minute to provide contact times of 0.05–0.25 second. After 10 minutes the hot zone has moved to a position in reactor 10 to establish a quench zone of minimum efficiency. The flow is stopped and again reversed by a proper manipulation of the control valves in the manifold system. During the succeeding upflow phase of the processing cycle the rate of flow of the reactant mixture of steam and ethane is reduced to 565 pounds per minute to provide a contact time of 0.1–0.5 second. The reaction effluent contains 20 mole percent of acetylene and 80 mole percent of ethylene. After 30 minutes of upflow operation the temperature of the hot zone has decreased to about 1550° F., and the reaction cycle is terminated.

At the end of the reaction cycle, the temperature profile of the pebble bed is as shown in Figure 1. The cool portion of bed C, at 300° F., extends from the bottom, or reactor feed entrance, of the bed to a bed length of two feet, and hot zone A of the bed, at 1550° F., is adjacent to the cool zone. The remaining one foot of bed length is residual quench zone B, at 300° F., at the top (or reaction products discharge) end of the bed.

To reposition hot zone A to the bottom of the pebble bed for the next reaction cycle, after purging the hydrocarbon vapors from the reactor by means of an inert flue gas, 65,000 standard cubic feet per minute of air at 70° F. is introduced to the top of the bed through line 17 by opening valve 19, shown in Figure 2. The position of the other valves, 13, 16, 22, 24, 26, 28 and 30, is as indicated. This flow of air is maintained for 11.5 minutes. During the first 8.5 minutes of this operation, the hot zone, at 1550° F., moves downward to the bottom of the bed, and the air discharges at 70° F. through exit 25. After the 8.5 minutes duration, the air flow is continued for 3 minutes to move 0.3 foot of hot zone A from reactor 10. During this period the air at 1550° F. discharges from the reactor through line 12. This is too high a temperature for contact with valves 13 and 22. Therefore, for this period, 17,300 cubic feet per minute of tempering air at 70° F. is introduced through lines 23 and valve 24. This tempering air mixes with the reactor discharge air in line 12 and lowers the temperature of the resulting air stream to 1250° F. which is sufficiently low for exposure to valves 13 and 22. This air stream at 1250° F. flows through the heat reservoir, 5 ft. x 5 ft. x 4.8 ft., packed with ¼-inch spherical alumina pebbles and discharges at 70° F. through line 25 and valve 26. The sensible heat in the air is transferred to the pebbles in the reservoir, thereby raising the pebble temperature to 1200° F.

The repositioning time of 11.5 minutes is considerably less than the corresponding times for previous processes. The reduction in the time required is achieved by utilizing a downward flow of air and requiring only a small fraction of the hot zone to be removed from the reactor. At the end of the heat transfer step a residual hot zone 1.7 feet long at a temperature of about 1550° F. remains in the reactor.

After this heat transfer step, the flow pattern shown in Figure 3 is fixed to establish a hot zone of two feet of reactor length at 2500° F. For this step, 2000 standard cubic feet per minute of fuel gas at 70° F. is admitted at line 27, through valve 28, to heat-reservoir 20. In reservoir 20, the fuel gas absorbs the heat stored during the purge step, and the temperature of the exit fuel gas is raised to 1160° F. A flow of air at 70° F. of 77,000 standard cubic feet per minute is admitted through line 23 and valve 24, admixing with the fuel gas in line 12 where combustion occurs in a conventional burner 50. The exothermic heat of combustion raises the temperature of the gaseous mixture of combustion products and excess air to 2550° F., and these gases flow through line 12 to reactor 10 to reheat the hot zone. The flow of fuel gas and air is maintained for thirty minutes after which time the hot zone at 2500° F. extends from the bottom of the pebble bed to a bed length of two feet, and the remainder of the bed is at 70° F. This completes the reheat process and the reactor is ready for another reaction period.

It is clearly shown by this illustration that the only heat removed from the system is the small amount lost due to radiation and conduction. Furthermore, since the major portion of the hot zone is heated only from 1500° to 2500° F., the fuel requirements for this reheat step are reduced to a fraction of those required by earlier processes which raise the hot zone temperature from 300° to 2500° F.

It is seen that by providing heat-reservoir 20, any of the heat removed from the reactor during the downflow phase of the reheating cycle is stored for subsequent return to the reactor. In carrying out the downflow heat-transfer phase of the reheating cycle the flow of heat-transfer gas is continued until sufficient heat is stored in heat reservoir 20 to provide a balance which will permit the use of minimum fuel requirements to effect the reestablishment of heat-zone A in reactor 10. The duration of the downflow, heat-transfer step will depend upon a number of factors including the length and temperature of the hot zone which is to be repositioned in the reactor during the reheating cycle, the thermo-chemistry of the fuel gas combustion, which is transferred to and stored in the heat reservoir, the temperature differential between the temperature of the hot zone remaining in the reactor at the end of the reaction cycle and the desired reaction temperature, and others. Accordingly the amount of reaction zone which is removed from the processing zone will depend upon the dynamic conditions of heat transfer between the spent reaction zone at minimum conversion temperature and the heated flue gas during the subsequent reheating and repositioning of the reaction zone in the processing zone. These conditions which are established by conventional heat transfer calculations for each processing scheme employed are such that the reaction zone is reestablished at substantially the same temperature and for substantially the same extent that existed when the process initially went on stream. This, of course, requires that the redevelopment of the reheated reaction zone progress at a faster rate than the movement of the spent reaction zone which functions as an intermediate quenching zone during the reheating. At proper conditions the interface between the primary quenching zone and the spent reaction zone will be concomitant with the interface between the primary quenching zone and the reestablished reaction zone when the reaction zone is in the desired position. Furthermore, less tempering air is required, for it is used only for the hot inert gas leaving the bottom of the reactor. This gas is hot only during that portion of the cycle when the spent hot zone is being partially removed from the reactor. This period is of short duration since only part of the hot zone leaves the reactor. Generally about 1 to 100 minutes is sufficient for this phase of the process; however, longer times may be required.

Faster reheating is possible for three reasons. First, high gas velocities may be used during the downflow purge because the fluidization velocity limitation imposed during upflow of gases is not present. Second, the hot zone moves only a relatively short distance during the three steps. In the reheating and regeneration of other fixed-bed pyrolytic processes, the spent, hot zone was removed from the top of the reactor, which meant that it had to be moved the full length of the bed. Third, the bed temperature has only to be raised from about 1500° F. to reaction temperature (about 2500° F.) whereas previous processes have required heating from a low temperature (below 300° F.) to reaction temperature. This last feature also reduces fuel requirements to a fraction of those required by earlier processes.

Air is the preferred medium to be employed in the downflow, heat-transfer phase of the reheating cycle because it will not only effect the desired heat transfer but will also combine with any carbonaceous deposits on the heat-transfer particles and cause their removal. Other inert gases, including flue gas, nitrogen, steam, etc., can be used if the problem of coke laydown on the particles does not exist. Because partial fluidization of the bed during this downward purge is not effected, high gas rates are employed. In general, rates in excess of 76 standard cu. ft. per minute per sq. ft. of cross-section can be employed. In general, purge rates of between 100 to 600 standard cu. ft. per minute per sq. ft. of cross-section are employed; however, the selected rate will depend upon the pressure-drop desired through the refractory bed in the processing vessel, and upon the size of the pebbles in the heat reservoir.

The heat-absorbing, refractory mass which is employed as the heat-transfer medium in the reaction zone and heat reservoir can be prepared from any heat-resistant refractory which is not susceptible to disintegration at the elevated processing temperature employed. These include but are not limited to mullite, fire clay, alumina, sillimanite, silica, carborundum, magnesite, zirconia, and zircon, or combinations thereof. Pebbles of the same composition can be employed in both the processing zone and heat reservoir zone. If desired, however, a different composition can be used in each zone. As pointed out, pebble size will depend primarily upon the pressure-drop desired during the operation of the process. In general, pebble sizes between about ⅛ and 2 inches are normally employed; however, larger or smaller sizes can be used. Large-size pebbles may be used in the heat reservoir, for very high rates of heat transfer are not required in the reservoir. The diameter of the pebbles contained in the reservoir may, therefore, be four to six times larger than the diameter of the pebbles contained in the reactor. Although in the illustrative example a heat-reservoir system utilizing granular material is employed, other refractory systems, including tubular tiles such as those used in the Hausche-Koppers system, I & E Chem. 47, p. 1517, as well as refractory checkerwork or other schemes for providing a heat-storage means which will release the stored heat to the incoming fuel gas components, can be employed.

The combustible gases employed to reheat and reposition the reaction zone can be any admixture which upon combustion will provide flue gases at an elevated temperature. These include the conventional fuel gases such as natural gas, water gas, coke oven gas, etc., admixed with suitable amounts of a free-oxygen-containing gas. In addition other combustible mixtures can be used (Vide Fuels and Combustion Handbook, Johnson, et al., McGraw-Hill, 1951). Although in the illustrative embodiment the fuel gas component of the combustible mixture was preheated, in utilizing the process of this invention it is also intended that either or both of the components of the combustible mixture can be preheated in the heat-transfer zone. Obviously, for each such variation an appropriate thermochemical heat balance will have to be determined in order to provide for the proper reestablishment of the hot zone of suitable temperature in the reactor.

The heat-reservoir scheme described herein can be used in the reheating and regenerating of heat-transfer pebbles employed in fixed bed, regenerative, refractory systems used in the conversion of gaseous reactants at elevated temperatures. As pointed out above, the instant invention has application in the processing of reactants at a high temperature which requires the immediate and rapid quenching of the reaction effluent to avoid undesirable side reactions. Although the invention can be applied to a variety of reactions it is especially suited to hydrocarbon conversion reactions involving C—C, and C—H scission, with accompanying dehydrogenation. Accordingly, a number of hydrocarbon feed stocks can be used including the normally gaseous $C_2$-$C_4$ hydrocarbons and mixtures thereof as well as higher boiling hydrocarbons, including petroleum products such as naphtha, gas-oil, and other petroleum compositions boiling between about 100°–600° F. Because the reactant functions to produce the cool zone, which during the reverse flow of reactant through the processing zone serves as the quenching zone, the reactant is introduced into the processing zone at a temperature about 300°–2000° F. below reaction temperature. Generally this temperature will be low enough to insure that the reactant mixture is completely in the gasiform phase upon being introduced into the processing zone. For example, in the pyrolysis of an ethane-steam mixture the temperature of the entering fluid is preferably about 300° F. to avoid condensation of the steam. In carrying out the gas conversion, temperatures of 1000° F. to 3500° F., pressures of about one atmosphere and contact times of 0.001–1 second are employed. In carrying out the reaction cycle various heat carriers such as steam, hydrogen, etc., can be introduced with the reactants to facilitate the reaction.

The product recovery system will depend upon the composition of the reaction effluent. Various systems for recovering unsaturated hydrocarbons such as propylene, ethylene, and acetylene are described in the prior art. In processing other types of feeds to produce cyanogen, acrylonitrile, etc., appropriate recovery systems will be utilized. It is evident that a wide variation in processing schemes can be employed in taking advantage of the instant invention. While the instant invention has been specifically described in relation to the processing of ethane feed stocks to produce ethylene and acetylene, modification of this process can be made by those skilled in the art without departing from the scope of invention as defined by the claims appended hereto.

I claim:

1. In a fixed bed, regenerative, refractory, pyrolytic gas conversion process where, in a processing zone, a cool gasiform reactant at a temperature substantially below reaction temperature is initially contacted momentarily in a reaction zone comprising a hot, aggregate mass of granular, refractory, heat-transfer particles heated to an elevated reaction temperature to produce a reaction effluent which is immediately thereafter contacted in a quenching zone comprising a first, cool, aggregate mass of granular, refractory, heat-transfer particles maintained at a temperature substantially below said reaction temperature superposed on said reaction zone in relation to the flow of reactants through said reaction zone whereby the temperature of said reaction effluent is rapidly reduced below the temperature at which undesirable side-reactions occur, the initial extent of said reaction zone and said quenching zone being sufficient to effectively carry out said gas conversion process, passing said reactant through said hot, aggregate zone until the interface between said reaction zone and quenching zone is positioned so as to afford a quenching zone of minimum efficiency and the temperature of said reaction zone has decreased to a minimum conversion level, thereby producing a cool zone comprising a second, cool, aggregate mass of granular, refractory heat-transfer particles adjacent said reaction zone in said processing zone, said processing zone comprising a unitary, aggregate mass of said heat-transfer particles, the process for reheating and repositioning said reaction zone in said processing zone which comprises terminating the flow of said reactant when the temperature of said reaction zone is reduced to about a minimum conversion level, passing a heat-transfer gas downwardly through said processing zone into a heat-reservoir vessel containing a refractory mass of a heat-transfer material, said refractory mass of a heat-transfer material at the time of initial contact with said heat-transfer gas being substantially cooler than said reaction zone, continuing the flow of said inert gas until the cool zone adjacent said reaction zone and a portion of said reaction zone has been displaced from said processing zone and at least a portion of the refractory mass in said heat-reservoir vessel has been heated to an elevated temperature substantially the same as the temperature of the reaction zone, terminating the flow of said inert gas, passing a cool component of a combustible admixture through the heat-transfer zone in direct heat exchange with the heated, refractory mass therein admixing the thus-heated component of the combustible mixture with another component to provide a combustible mixture, igniting said mixture in a combustion zone to produce heated flue gases at about said elevated reaction temperature, passing the heated flue gases resulting from the combustion of said mixture through said processing zone until the interface between said quenching zone and said reaction zone is substantially in the initial position, terminating the flow of said flue gases, and reintroducing said hydrocarbon reactant into said reaction zone.

2. In a fixed-bed, regenerative, pyrolytic, hydrocarbon gas conversion process where, in a processing zone, a cool gasiform hydrocarbon reactant at a temperature substantially below reaction temperature is initially contacted for about 0.001–0.1 second in a reaction zone comprising a hot, aggregate mass of granular, refractory, heat-transfer particles heated to a reaction temperature of about 1000°–3500° F. to induce C—C scission and C—H scission in said hydrocarbon reactant to produce a reaction effluent containing low molecular weight unsaturated hydrocarbons which is immediately thereafter contacted in a quenching zone comprising a first, cool, aggregate mass of granular, refractory, heat-transfer particles maintained at a temperature substantially below said reaction temperature superposed on said reaction zone in relation to the flow of reactants through said reaction zone whereby the temperature of said reaction effluent is rapidly reduced below the temperature at which undesirable side-reactions occur, the initial extent of said reaction zone and said quenching zone being sufficient to effectively carry out said gas conversion process, passing said reactant through said hot, aggregate zone until the interface between said reaction zone and quenching zone is positioned so as to afford a quenching zone of minimum efficiency and the temperature of said reaction zone has decreased to a minimum conversion level, thereby producing a cool zone comprising a second, cool, aggregate mass of granular, refractory heat-transfer particles adadjacent said reaction zone in said processing zone, said processing zone comprising a unitary, aggregate mass of said heat-transfer particles, the process for reheating and repositioning said reaction zone in said processing zone which comprises terminating the flow of said reactant when the temperature of said reaction zone is reduced to about minimum conversion level, passing a heat-transfer gas downwardly through said processing zone into a heat-reservoir vessel containing a refractory mass of a heat-transfer material, said refractory mass of a heat-transfer material at the time of initial contact with said heat-transfer gas being substantially cooler than said reaction zone, continuing the flow of said inert gas until the cool zone adjacent said reaction zone and a portion of said reaction zone has been displaced from said processing zone and at least a portion of the refractory mass in said heat-reservoir vessel has been heated to an elevated temperature, substantially the same as the temperature of the reaction zone, terminating the flow of said inert gas, passing a cool component of a combustible admixture through the heat-transfer zone, in direct heat exchange with the heated, refractory mass therein, admixing the thus-heated component of the combustible mixture with another component to provide a combustible mixture, igniting said mixture in a combustion zone to produce heated flue gases at about said elevated reaction temperature, passing the heated flue gases resulting from the combustion of said mixture through said processing zone until the interface between said quenching zone and said reaction zone is substantially in the initial position terminating the flow of said flue gases, and reintroducing said hydrocarbon reactant into said reaction zone.

3. In a process in accordance with claim 2 in which the temperature of said quenching zone is about 300°–2200° less than that of said reaction zone.

4. In a fixed-bed, regenerative, pyrolytic, hydrocarbon gas conversion process where, in a processing zone, a cool gasiform hydrocarbon reactant at a temperature substantially below reaction temperature is initially contacted for about 0.001–0.1 second in a reaction zone comprising a hot, aggregate mass of granular, refractory, heat-transfer particles heated to a reaction temperature of about 1000°–3500° F. to induce C—C scission and C—H scission in said hydrocarbon reactant to produce a reaction effluent containing low molecular weight unsaturated hydrocarbons which is immediately thereafter contacted in a quenching zone comprising a first, cool, aggregate mass of a granular, refractory, heat-transfer particles maintained at a temperature substantially below said reaction temperature superposed on said reaction zone in relation to the flow of reactants through said reaction zone whereby the temperature of said reaction effluent is rapidly reduced below the temperature at which undesirable side-reactions occur, the initial extent of said reaction zone and said quenching zone being sufficient to effectively carry out said gas conversion process, passing said reactant through said hot, aggregate zone until the interface between said reaction zone and quenching zone is positioned so as to afford a quenching zone of minimum efficiency and the temperature of said reaction zone has decreased to a minimum conversion level, thereby producing a cool zone comprising a second, cool, aggregate mass of granular, refractory heat-transfer particles subadjacent said reaction zone in said processing zone, said processing zone comprising a unitary, aggregate mass of said heat-transfer particles, the process for reheating and repositioning said reaction zone in said processing zone which comprises terminating the flow of said reactant when the temperature of said reaction zone is reduced to about minimum conversion level, passing a free-oxygen-containing heat-transfer gas downwardly through said processing zone into a heat-reservoir vessel containing a heat-transfer material comprising a cool, aggregate mass of granular, refractory, heat-transfer particles, said particles at the time of initial contact with said heat-transfer gas being substantially at ambient atmospheric temperature continuing the flow of said inert gas until the cool zone subjacent said reaction zone and a portion of said reaction zone have been displaced from said processing zone and at least a portion of the refractory mass in said heat-reservoir vessel has been heated to an elevated temperature substantially the same as the temperature of the reaction zone, terminating the flow of said inert gas, passing a cool component of a combustible admixture at substantially, ambient atmospheric temperature through the heat-transfer zone, admixing the thus-heated component of the combustible mixture with another component to provide a combustible mixture, igniting said mixture in a combustion zone to produce heated flue gases at about said elevated reaction temperature passing the heated flue gases resulting from the combustion of said mixture through said processing zone until the interface between said quenching zone and said reaction zone is substantially in the initial position, terminating the flow of said flue gases, and reintroducing said hydrocarbon reactant into said reaction zone.

5. A process in accordance with claim 4 in which the diameter of the heat-transfer particles in said heat-reservoir vessel is 4–6 times the diameter of the heat-transfer particles in said processing zone.

6. A process in accordance with claim 4 in which the several components of the combustible mixture are passed through the heat-storage reservoir prior to said igniting.

7. A process in accordance with claim 4 in which said quenching zone is about 300°–2200° F. cooler than said reaction zone.

References Cited in the file of this patent

UNITED STATES PATENTS 2,629,753  Frevel et al. _____ Feb. 24, 1953